Nov. 11, 1969     H. E. KREISS     3,477,332

PERCUSSION INSTRUMENT WITH VERTICALLY STEPPED SCALE

Filed Sept. 11, 1967

INVENTOR.
HULDA E. KREISS
BY Knox & Knox

United States Patent Office 3,477,332
Patented Nov. 11, 1969

3,477,332
PERCUSSION INSTRUMENT WITH VERTICALLY STEPPED SCALE
Hulda E. Kreiss, 4702 E. Mountain View Drive, San Diego, Calif. 92116
Filed Sept. 11, 1967, Ser. No. 666,639
Int. Cl. G10d 13/08; G09b 15/00
U.S. Cl. 84—403                                     1 Claim

ABSTRACT OF THE DISCLOSURE

The instrument is primarily for teaching or training purposes and has vertically stepped, tone producing striker bars in progressive order to show their natural sequence, the vertical stepping representing the frequency relationships of the various tones in a scale. The instrument can be used for playing tunes and the scale can be used to demonstrate progressive order in other series of units, characters of values.

BACKGROUND OF THE INVENTION

The present invention relates to teaching aids and specifically to a percussion instrument with a vertically stepped scale.

Musical tones provide a readily recognizable stepped scale of values, a characteristic which can be useful in teaching techniques, particularly with handicapped or retarded children. For such purposes many types of visual and physical aids have been developed to combine teaching with entertainment and pleasure.

SUMMARY OF THE INVENTION

The percussion instrument described herein has a frame which is stepped in the manner of a staircase, and on each step is a tone producing striker bar to be struck by a small hammer or similar means. Each striker bar produces a specific musical tone and the bars are arranged in order in a musical scale with the tones rising in frequency up the steps of the frame. Thus the relationship of the tones as being "higher" or "lower" in the scale can be seen as well as heard. The basic instrument can be used to demonstrate the relative values or the natural order of other units or characters, such as numbers, the alphabet, or the like.

BRIEF DESCRIPTION OF THE DRAWINGS

Similar characters of reference indicate similar or identical elements and portions throughout the specification and throughout the views of the drawings.

DESCRIPTION OF THE PREFERRED EMBODIMENTS

Figure 1:
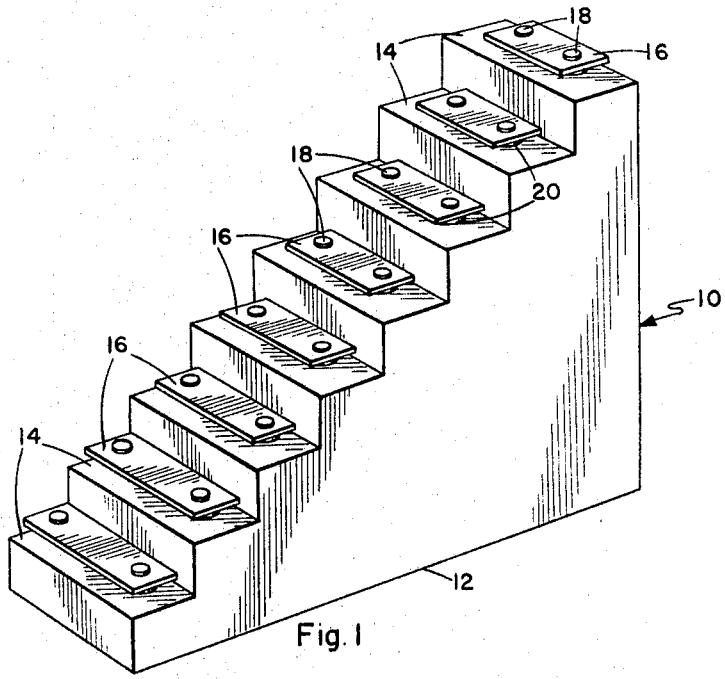
FIGURE 1 is a perspective view of a typical form of the instrument.

In its basic form shown in FIGURE 1, the instrument comprises a box-like frame 10 having a flat base 12 for resting securely on a supporting surface and provided with a plurality of steps 14 ascending from one lower corner to the opposite upper corner. On each step 14 is mounted a tone producing striker bar 16 of metal, wood, or other suitable material, which will produce a musical tone when struck by a small hammer or mallet, as in playing a xylophone or similar instrument. Each bar 16 is held in place by a pair of headed pins 18 on which the bar is loosely retained, the bar resting on spacers 20 of felt, or similar material to allow the bar to vibrate when struck. The technique of mounting such tone producing bars is well known and the pins 18 may be integral with or secured to the frame 10 in any suitable manner, depending on the specific structure.

As illustrated the frame 10 has eight steps and the striker bars 16 are tuned to the natural tones of a complete octave. This is merely an example and any suitable number of steps and tones can be used. To facilitate identification the individual tones are marked by indicia 22, applied so as to be readily visible, as in FIGURE 2. The bars 16 increase in resonant frequency as the steps become progressively higher, so presenting the concept of "higher" and "lower" values in a manner which is very easily understood.

Figures 2, 3:
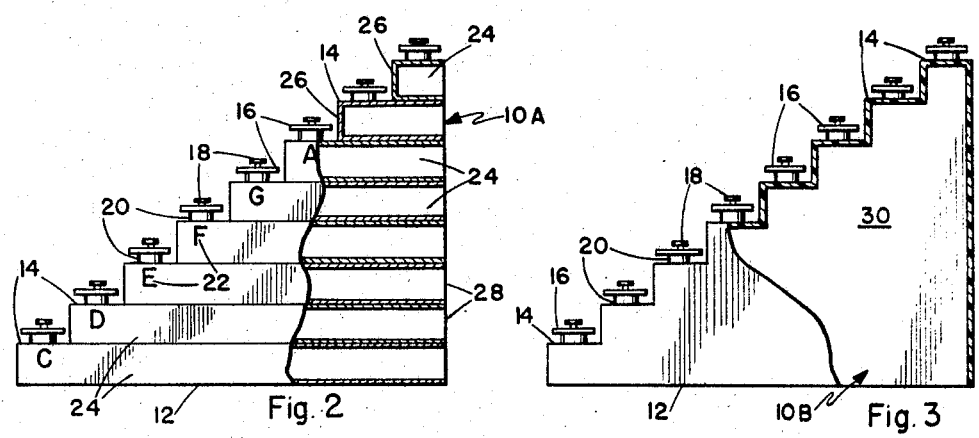
FIGURE 2 is a side elevation view, partially cut away, showing one form of construction using stacked step units.
FIGURE 3 is a side elevation view, partially cut away, of an alternative unitary hollow frame.

The frame 10 may be made from a variety of materials with several different forms of construction. In FIGURE 2, the frame 10A is built up from hollow rectangular box units 24 of graduated lengths and stacked to form the steps 14. Each box unit 24 is preferably closed at the end 26 forming the vertical face of a step, the other end 28 being open. The box units act as sound amplifying chambers for the individual tones and could, if necessary, be tuned for maximum efficiency, although this would not normally be required for the intended purpose of the instrument.

In a second form, shown in FIGURE 3, the frame 10B is a unitary hollow box structure, which could be molded from plastic or built up of panels of suitable material. The entire enclosed chamber 30 would then act as a sound box.

Figure 4:
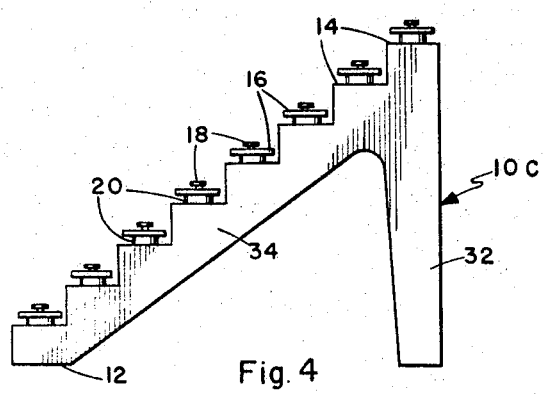
FIGURE 4 is a side elevation view of a further frame configuration.

A further form, shown in FIGURE 4, utilizes an open frame 10C having an upright post portion 32 and an inclined ramp portion 34 on which the steps 14 are located. This frame could be cut from solid material or built up in any suitable manner. Other types of construction may be used, those shown merely being examples.

By applying suitable indicia to the steps, other values or progressive orders could be displayed. For instance, with a sufficient number of steps the complete alphabet could be shown in its proper order, the progressive tones simplifying the understanding and learning. Various other adaptations for teaching purposes will be apparent.

I claim:
1. A percussion instrument, comprising:
a frame having a horizontal base and a plurality of horizontally and vertically spaced steps, said frame being a hollow, sound amplifying box structure having a plurality of hollow elongated box-like members of progressively different lengths, said members being stacked vertically and displaced horizontally to form said steps; and
a tone producing striker bar mounted on each of said steps, the resonant frequencies of the bars increasing progressively in relation to the progressive increase in height of the steps above said base.

References Cited

UNITED STATES PATENTS

| 1,276,839 | 8/1918 | Weber | 84—403 |
| 1,586,769 | 6/1926 | Askin | 84—403 |

FOREIGN PATENTS 680,251   10/1952   Great Britain.

RICHARD B. WILKINSON, Examiner

L. R. FRANKLIN, Assistant Examiner

U.S. Cl. X.R.
84—470

UNITED STATES PATENT OFFICE
CERTIFICATE OF CORRECTION

Patent No. 3,477,332                      Dated November 11, 1969

Inventor(s) Hulda E. Kreiss

It is certified that error appears in the above-identified patent and that said Letters Patent are hereby corrected as shown below:

In the first column in the line directly under the title, the inventor's address should be changed from "4702" to --4706-- E. Mountain View Drive.

SIGNED AND
SEALED
MAR 10 1970

(SEAL)
Attest:

Edward M. Fletcher, Jr.
Attesting Officer

WILLIAM E. SCHUYLER, JR.
Commissioner of Patents